United States Patent Office 3,128,227
Patented Apr. 7, 1964

3,128,227
ANTIBIOTIC INTRAMUSCULAR COMPOSITION
Leon Abbott Kanegis and Lawrence Ritter, New City, N.Y., assignors to American Cyanamid Company, New York, N.Y., a corporation of Maine
No Drawing. Filed June 17, 1954, Ser. No. 437,553
18 Claims. (Cl. 167—65)

This invention relates to a composition of matter comprising a broad-spectrum antibiotic such as tetracycline or oxytetracycline which when dissolved or suspended in water at a concentration ranging from about 5 to 100 milligrams of the antibiotic per milliliter of solution is particularly suitable for intramuscular injection.

The invention includes the composition of matter and aqueous solutions containing the same. In many instances in the treatment of humans or animals with antibiotics it is desirable that the material be administered by intramuscular injection to be certain that the desired therapeutic dose of the antibiotic is received and retained by the patient. Intravenous administration is difficult and sometimes causes harmful side effects. Unfortunately, however, some antibiotics are not suitable for intramuscular injection because satisfactory blood levels of suitable duration are not obtainable, pain on injection is experienced and necrosis often occurs. Tetracycline and oxytetracycline are among the antibiotics which are difficult to administer by the intramuscular route.

The present preparation gives better blood levels, less tissue damage, and causes less pain and irritation in intramuscular tetracycline and oxytetracycline preparations. Tetracycline and oxytetracycline are sufficiently soluble at the lower pH ranges of our composition that they may be administered in therapeutic sized doses in solution in a volume which is conveniently administered intramuscularly. Near the upper limits of the pH range, some of the antibiotic may remain suspended as fine particles in the solution, and may be injected as such a suspension. The composition is not objectionally painful and does not cause undue tissue damage nor local reaction in either human or animal subjects, as either a solution or a suspension. For uniformity of dispersion, and for trade acceptance, a solution is preferred. The formation of a clear solution is itself proof of the absence of insoluble contaminants.

Our composition has therein the tetracycline or oxytetracycline as an acid salt, preferably the hydrochloride, or other mineral acid salt, or as neutral tetracycline or oxytetracycline or as a basic salt of the antibiotic; ions of a water-soluble, non-toxic, hydroxy acid (including lactones of such acids) such as citric acid, ascorbic acid, gluconic acid and thioglycollic acid and mineral acid salts of amino-carboxylic acids, such as cysteine hydrochloride; a soluble source of magnesium ions; and preferably a local anesthetic.

The use of the local anesthetic is not essential particularly for veterinary use, but is desirable to minimize local irritation and pain.

Of the local anesthetics, procaine hydrochloride is the best known at present. Other materials may be used as local anesthetics which are related in structure to procaine, or the local anesthetics which have different configurations. Such anesthetics include procaine which is diethylaminoethyl-p-aminobenzoate, xylocaine which is diethylaminoacet-2,6 xylidide, hydroxy-procaine which is diethylaminoethyl-o-hydroxy-p-aminobenzoate, 2-chloroprocaine which is diethylaminoethyl-o-chloro-p-hydroxybenzoate, piperocaine which is 3-(2-methylpiperidino)-propylbenzoate, hexylcaine which is 1-cyclohexylamino-2-propylbenzoate, diethoxin which is diethylaminoethyl-4-ethoxybenzoate, tetracaine which is dimethylaminoethyl-p-n-butylaminobenzoate and larocaine which is diethylaminoneopentyl-p-aminobenzoate. These local anesthetics may be used in the free form but are more conveniently used as an acid salt, preferably the hydrochloride.

The magnesium is present as a soluble ionizable form of magnesium such as a magnesium halide, including hydrates, such as magnesium chloride hexahydrate, or magnesium sulfate or the magnesium may be present as a salt with one of the other constituents such as magnesium citrate. The soluble magnesium ions appear to induce a reduction in tissue damage. Magnesium chloride hexahydrate is very convenient as the magnesium ion source but does cause some complications in the preparation of sterile compounds as the hydrate of magnesium chloride can release moisture which can cause complications in the sterilization of the final product. However, it is a completely satisfactory component and may be conveniently sterilized first and then aseptically added to a mixture if the mixture is not conveniently sterilizable as such.

The magnesium ions may also be added as magnesium sulfate, magnesium nitrate, magnesium bromide or any other non-toxic inorganic salt or as a salt with a non-toxic organic acid including magnesium acetate, magnesium glycinate, magnesium citrate, magnesium ascorbate and others.

The soluble hydroxy acid added either as the acid itself or in form which in solution gives anions equivalent to those from the free acid, has the unique advantage of increasing the rate of absorption and utilization of the antibiotic and is referred to as an absorption enhancer. Various explanations as to why this should be so, range from the effect that such materials have or may have on a metabolic cycle such as the Krebs cycle to the complexing proclivities of this component with various heavy metals which might otherwise complex with the antibiotic. Both theories may be correct. By using such an absorption enhancer the rate of absorption of the antibiotic in the preparation becomes such that an intramuscular injection gives higher blood levels.

The hydroxy-acid constituent is conveniently added in part as the free acid to assist in pH control. At least some or all of the absorption enhancer may be added as a salt. When citric or ascorbic acids are used they may be conveniently added in part as the sodium salt or other harmless salt. Some of the acid may be added as the magnesium salt or a salt with the antibiotic. By having part of the acid present as a salt the pH of the final solution is somewhat higher than would otherwise be the case.

The antibiotic may be present as tetracycline hydrochloride as a most readily available commercial form, but also may be used as the hydrobromide, the sulfate, the nitrate, the citrate, the ascorbate, the gluconate, or the neutral form or as a salt with a base such as the sodium, potassium, ammonia, calcium or magnesium salts, similar compounds of oxytetracycline may be used. With neutral or basic salts, as the antibiotic component, the other constituents must necessarily be such that the pH is within the desired limits. For many purposes the individual salts of a single antibiotic are preferred, for other purposes mixtures of salts or mixtures of antibiotics are considered therapeutically advantageous.

In the past it has been considered desirable to formulate intramuscular preparations so that the pH would be near the normal pH of the body tissue. In the present instance the antibiotic would be insoluble at such a pH. Unexpectedly the present preparation may be injected at an acid pH within the range of preferably about 1.9 to 2.25 without undue tissue irritation or pain. Any pH below 5 is satisfactory for injection, but a pH below about 4.5 is preferred so that the antibiotic is in solution for intramuscular administration.

The solubility of the antibiotic is influenced by the other ions present. At a concentration of 50 milligrams of antibiotic per milliliter in the presence of ascorbate ions, the pH can be as high as 4.8 with the antibiotic remaining in the solution for several hours. With citrate ions the pH may be as high as 4.3 and the solution will remain clear for several hours. At a lower pH the solution will remain clear for a longer period or indefinitely. It is not necessary that the solutions be clear for administration but a clear solution is more acceptable to the medical profession and there is less danger of non-homogeneity.

Tissue irritation and pain, particularly with the use of tetracycline, is far less than would be anticipated from comparative studies on other antibiotics.

The hydroxy acid absorption enhancer may be any which is intramuscularly acceptable, but ascorbic acid is particularly useful as it also has a physiological function, and a preparation containing ascorbic acid for pH control and increased absorption of the antibiotic augments the body's reserve of vitamin C which increase is desirable during times of sickness and stress.

Citric acid gives slightly higher blood levels than ascorbic acid and is essentially free from pain on administration, but is harder to prepare from the formulating standpoint.

The constituents for the present mixture are conveniently prepared as a sterile, dry powder prior to administration and are kept in sterile vials in dry form. Before use, water may be added to form a clear solution of the desired strength. This solution is stable for a period of at least 24 hours, which is long enough for administration in hospital use.

Alternatively one or more of the more storage stable constituents of the composition may be present in the aqueous diluent. The anesthetic particularly may be present in the aqueous diluent as may the solution of magnesium ions or the hydroxy acid or mixtures of them. It is more convenient, however, to have all of the constituents except the water present in the completed vial to reduce the possibility of error in compounding at the time of administration and also to obviate the necessity for a separately labeled diluent. Water for injection is normally available in hospitals and a doctor's kit, so that by using a common source of water for injection, the number of preparations which must be on hand is reduced.

The proportions may vary over a considerable range with advantageous results. Any appreciable fraction of the hydroxy acid adjuvant contributes towards an increased rate of absorption and higher blood levels. It is preferred that approximately as much of the hydroxy acid ions as of the antibiotic be present and up to about 3 times as much as the hydroxy acid ions as of the antibiotic may be advantageously used. Larger proportions of the acid, particularly if ascorbic acid is used, are not deleterious. Less than equal weight proportions of the acid are advantageous, but not as effective as if the equal weight be used.

From about 1 to 15 milligrams per milliliter of magnesium ion in the injection preparation are useful. About 2 to 6 milligrams per milliliter is preferred. The antibiotic is preferably present in the range of approximately 10 to 100 milligrams per milliliter of injected solution, calculated as the antibiotic hydrochloride. 50 milligrams per milliliter is a particularly convenient therapeutic concentration level. Higher or lower concentrations may be used but concentrations below 10 milligrams per milliliter require volumes of diluent which are larger than is normally desired.

The amount of the anesthetic should be enough for effective local anesthetic effect. With procaine hydrochloride from ½ to 4% is a very effective range. 2% is commonly used. With more or less potent anesthetics the concentration can be proportionately adjusted.

In the compounding of the material for injection it is desirable that the materials be stored dry to insure storage stability.

To prepare the sterile material the components may be individually sterilized and then blended, or they may be mixed and then sterilized by appropriate means such as irradiation with high frequency radiation or neutrons.

The antibiotic may be discolored if heated in the presence of the magnesium ion. It is a preferred embodiment of this invention to mix the antibiotic, the anesthetic and the hydroxy acid adjuvant in a finely ground state and sterilize the mixture with ethylene oxide. The magnesium ion component which may be present as magnesium chloride hexahydrate can be sterilized by heating, for example, at 110° C. for about 12 hours with regrinding if caking is noticed. Part of the water content may be lost by this treatment. The sterile magnesium ion component is then aseptically blended with the remaining constituents and sterilely filled into containers.

With other magnesium compounds, the final composition may be sterilized after admixture with ethylene oxide or heat.

By way of illustration but not limitation certain examples of the compositions and results which have been obtained in both main and animal are shown below.

EXAMPLE 1

500 parts of tetracycline hydrochloride, 500 parts of anhydrous citric acid and 200 parts of procaine hydrochloride were ground together in a screen grinder (Fitzpatrick) and then sterilized by exposing the mixture to ethylene oxide, containing sufficient carbon dioxide so as to be non-explosive, at 40° C. for 7 hours. 500 parts of magnesium chloride hexahydrate were heated at 110° C. for 12 hours then ground and reheated for an additional 12 hours at 110° C. The moisture content was reduced to about the equivalent of 4 molecules of water of crystallization. The sterilized magnesium chloride was blended aseptically with the other constituents and filled into glass vials each vial containing 500 milligrams of antibiotic and designed to be made up to 10 milliliters of solution having 50 milligrams per milliliter of antibiotic activity.

The dry preparation whe dissolved in water by the addition of sterile water in such quantities that the solution formed had a concentration of 50 milligrams of antibiotic activity per milliliter gave a pH of approximately 1.5. The solution was clear and remained clear on standing.

The above composition was injected intramuscularly in dogs at a dosage level of 2 milligrams per pound of body weight. No undue evidence of irritation or pain was observed. The blood levels in micrograms per milligram of tetracycline hydrochloride were found to be:

| | Hours |
|---|---|
| 3.02 | ½ |
| 2.58 | 1 |
| 1.78 | 2 |
| 1.49 | 4 |
| 1.58 | 6 |
| 1.18 | 8 |
| 0.50 | 12 |
| 0.18 | 24 | giving a 12 hour mean of 1.73.

EXAMPLE 2

A composition was prepared following the procedure set forth in Example 1, containing:

| | Parts |
|---|---|
| Tetracycline HCl | 500 |
| $MgCl_2 \cdot 6H_2O$ | 500 |
| Sodium citrate·$2H_2O$ | 770 |
| Procaine HCl | 200 |

When made up with water to a concentration of 50 milligrams per milliliter of tetracycline activity, the pH was 4.5. When injected at a dosage level of 2 milligrams per pound of body weight in dogs, the average blood levels in micrograms per milliliter for four dogs was found to be:

| | Hours |
|---|---|
| 1.58 | ½ |
| 1.59 | 1 |
| 0.96 | 2 |
| 0.80 | 4 |
| 0.70 | 6 |
| 0.67 | 8 |
| 0.93 | 12 |
| 0.20 | 24 | giving a 12 hour mean of 1.03.

EXAMPLE 3

A composition was prepared following the procedure set forth in Example 1, containing:

| | Parts |
|---|---|
| Tetracycline HCl | 500 |
| $MgCl_2 \cdot 6H_2O$ | 500 |
| Sodium citrate $\cdot 2H_2O$ | 600 |
| Citric acid (anhydrous) | 226 |
| Procaine HCl | 200 |

When made up with water to a concentration of 50 milligrams per milliliter of tetracycline activity, the pH was 3.8. When injected at a dosage level of 2 milligrams per pound of body weight in dogs, the average blood levels in micrograms per milliliter for four dogs was found to be:

| | Hours |
|---|---|
| 1.91 | ½ |
| 1.88 | 1 |
| 1.72 | 2 |
| 1.19 | 4 |
| 1.17 | 6 |
| 1.02 | 8 |
| 0.81 | 12 |
| 0.27 | 24 | giving a 12 hour mean of 1.38.

EXAMPLE 4

A composition was prepared following the procedure set forth in Example 1, containing:

| | Parts |
|---|---|
| Tetracycline HCl | 500 |
| $MgCl_2 \cdot 6H_2O$ | 500 |
| Citric acid (anhydrous) | 500 |
| Oxycaine HCl | 200 |

When made up with water to a concentration of 50 milligrams per milliliter of tetracycline activity, the pH was 1.6. When injected at a dosage level of 2 milligrams per pound of body weight in dogs, the average blood levels in micrograms per milliliter for four dogs was found to be:

| | Hours |
|---|---|
| 2.65 | ½ |
| 3.15 | 1 |
| 1.99 | 2 |
| 1.40 | 4 |
| 1.18 | 6 |
| 0.96 | 8 |
| 0.96 | 12 |
| 0.28 | 24 | giving a 12 hour mean of 1.76.

EXAMPLE 5

A composition was prepared consisting of:

| | Parts |
|---|---|
| Tetracycline HCl | 500 |
| Magnesium citrate ("soluble") | 750 |
| Procaine HCl | 200 |

These components were ground together and sterilized by exposing to a mixture of ethylene oxide containing sufficient carbon dioxide so as not to be explosive at 40° C. for 7 hours. The composition was stored in glass vials. When ready for use the solution was made up by adding sufficient water to give a concentration of 50 milligrams per milliliter of tetracycline as the hydrochloride. When made up with water to a concentration of 50 milligrams per milliliter of tetracycline activity, the pH was 3.2. When injected at a dosage level of 2 milligrams per pound of body weight in dogs, the average blood levels in micrograms per milliliter for four dogs was found to be:

| | Hours |
|---|---|
| 1.92 | ½ |
| 2.69 | 1 |
| 2.15 | 2 |
| 1.44 | 4 |
| 1.23 | 6 |
| 1.06 | 8 |
| 0.88 | 12 |
| 0.33 | 24 | giving a 12 hour mean of 1.62.

EXAMPLE 6

A composition was prepared following the procedure set forth in Example 5, containing:

| | Parts |
|---|---|
| Tetracycline HCl | 500 |
| $MgSO_4$ (dried) | 360 |
| Citric acid (anhydrous) | 500 |
| Procaine HCl | 200 |

When made up with water to a concentration of 50 milligrams per milliliter of tetracycline activity, the pH was 1.95. When injected intramuscularly at a dosage level of 2 milligrams per pound of body weight in dogs, the average blood levels in micrograms per milliliter for four dogs was found to be:

| | Hours |
|---|---|
| 2.18 | ½ |
| 1.82 | 1 |
| 2.33 | 2 |
| 1.26 | 4 |
| 1.37 | 6 |
| 0.82 | 8 |
| 0.84 | 12 |
| 0.22 | 24 | giving a 12 hour mean of 1.52.

EXAMPLE 7

A composition was prepared following the procedure set forth in Example 1, containing:

| | Parts |
|---|---|
| Tetracycline HCl | 500 |
| $MgCl_2 \cdot 6H_2O$ | 500 |
| Ascorbic acid | 1250 |
| Procaine HCl | 200 |

When made up with water to a concentration of 50 milligrams per milliliter of tetracycline activity, the pH was 1.9. When injected intramuscularly at a dosage level of 2 milligrams per pound of body weight in dogs, the average blood levels in micrograms per milliliter for four dogs was found to be:

| | Hours |
|---|---|
| 2.09 | ½ |
| 2.46 | 1 |
| 2.01 | 2 |
| 1.30 | 4 |
| 1.62 | 6 |
| 0.97 | 8 |
| 0.84 | 12 |
| 0.22 | 24 | giving a 12 hour mean of 1.61.

EXAMPLE 8

A composition was prepared following the procedure set forth in Example 1, containing:

| | Parts |
|---|---|
| Tetracycline HCl | 500 |
| $MgCl_2 \cdot 6H_2O$ | 500 |
| Glucono-D-lactone | 2,000 |
| Procaine HCl | 200 |

When made up with water to a concentration of 50 milligrams per milliliter of tetracycline activity, the pH was 1.7. When injected intramuscularly at a dosage level of 2 milligrams per pound of body weight in dogs, the average blood levels in micrograms per milliliter for four dogs was found to be:

| Hours | | Hours | |
|---|---|---|---|
| 2.05 | ½ | 1.44 | 6 |
| 1.94 | 1 | 0.93 | 8 |
| 1.84 | 2 | 0.84 | 12 |
| 2.15 | 4 | 0.20 | 24 | giving a 12 hour mean of 1.60.

EXAMPLE 9

A composition was prepared as in Example 7, dissolved in water at a concentration to 50 milligrams of tetracycline hydrochloride per milliliter of solution and 2 milliliters of the solution injected intramuscularly into a series of persons so that each patient received a total of 100 milligrams of tetracycline hydrochloride. The blood levels in 6 patients were then found to be:

*Tetracycline Hydrochloride Levels—Blood Serum in Micrograms Per Milliliter*

| Subject | 2 hours | 4.5 hours | 7 hours |
|---|---|---|---|
| B | 1.0 | (¹) | 1.12 |
| L | 1.12 | 1.25 | 0.95 |
| K | 0.64 | 0.69 | 0.51 |
| T | 1.05 | 0.79 | 0.67 |
| Ch | 0.75 | 0.71 | 0.71 |
| Cz | 0.54 | 0.49 | 0.43 |
| Average | 0.85 | 0.79 | 0.73 |

¹ Tube broke in centrifuge.

EXAMPLE 10

Six human patients were injected intramuscularly with a total of 100 milligrams of tetracycline hydrochloride dissolved in 2 cc. of water prepared from the composition given in Example 1.

*Tetracycline Hydrochloride Levels—Blood Serum in Micrograms Per Milliliter*

| Subject | 2 hours | 4.5 hours | 7 hours |
|---|---|---|---|
| E | 1.0 | 0.74 | 0.42 |
| Ly | 0.72 | 0.69 | 0.62 |
| M | 0.97 | 0.94 | 0.77 |
| N | 1.27 | 1.27 | 0.99 |
| P | 0.86 | 0.79 | 0.65 |
| V | 0.88 | 0.56 | 0.53 |
| Average | 0.95 | 0.83 | 0.66 |

These blood levels represent a therapeutically effective dosage level.

EXAMPLE 11

Tetracycline hydrochloride was filled into vials, and sterilized using ethylene oxide. A solution was prepared containing 2% procaine hydrochloride, 5% citric acid and 5% magnesium chloride hexahydrate, in water. This solution was passed through a sterile filter to give a sterile solution and used to dissolve the tetracycline hydrochloride. The tetracycline hydrochloride was dissolved in such a quantity as to give a solution containing 50 milligrams tetracycline hydrochloride per milliliter. As so prepared the solution was injected intramuscularly in humans. The following blood levels represent the average blood levels obtained in 10 patients, expressed in micrograms per milliliter. The dosage levels in milligrams per adult patient are shown:

| Dosage, Tetracycline HCl | Blood Levels Micrograms/Milliliter | | | |
|---|---|---|---|---|
| | 2 hrs. | 4 hrs. | 6 hrs. | 8 hrs. |
| 50 mg | 0.359 | 0.307 | 0.298 | 0.248 |
| 75 mg | 0.359 | 0.550 | 0.475 | 0.439 |
| 100 mg | 0.726 | 0.624 | 0.524 | 0.518 |

A comparable group of patients were treated with a solution prepared omitting the citric acid. The corresponding blood levels were found to be:

| Dosage, Tetracycline HCl | Blood Levels Micrograms/Milliliter | | | |
|---|---|---|---|---|
| | 2 hrs. | 4 hrs. | 6 hrs. | 8 hrs. |
| 50 mg | 0.191 | 0.141 | 0.163 | 0.173 |
| 75 mg | 0.338 | 0.319 | 0.293 | 0.293 |
| 100 mg | 0.379 | 0.366 | 0.373 | 0.350 |

EXAMPLE 12

10 patients were treated with tetracycline hydrochloride dissolved in a solution containing 5% citric acid and 5% magnesium chloride hexahydrate, prepared as set forth in Example 11. The product on intramuscular injection gave adequate blood levels, but in some patients, was slightly painful.

EXAMPLE 13

Vials were prepared by mixing in each vial:

| | Mg. |
|---|---|
| Tetracycline HCl | 100 |
| $MgCl_2 \cdot 6H_2O$ | 100 |
| Citric acid (anhydrous) | 100 |
| Procaine HCl | 40 |

Water was added to the vials to give 100 milliliters of solution and the thus prepared solution injected intramuscularly in dogs at a dosage level of 2 milligrams of tetracycline hydrochloride per pound of body weight. The average blood levels of the tetracycline hydrochloride for three such dogs was found to be:

| | Micrograms per milliliter |
|---|---|
| 1 hour | 3.6 |
| 2 hours | 2.72 |
| 4 hours | 1.94 |
| 8 hours | 1.67 |

EXAMPLE 14

Vials were made up as in Example 13, containing:

| | Mg. |
|---|---|
| Tetracycline HCl | 100 |
| $MgCl_2 \cdot 6H_2O$ | 100 |
| Gluconic acid | 200 |
| Procaine HCl | 40 |

When similarly injected intramuscularly in dogs, the average blood levels were:

| | Micrograms per milliliter |
|---|---|
| 1 hour | 2.7 |
| 2 hours | 2.78 |
| 4 hours | 2.47 |
| 8 hours | 1.02 |

A group of dogs were injected intramuscularly with solutions of the antibiotics at a dosage level of 2 milligrams of antibiotic per pound of body weight. The solutions were made up by mixing the antibiotic with a solution containing the other components. Identical results are obtainable by adding water to vials containing a mixture of the solid components. For solutions containing the components shown, the blood levels in micrograms per milliliter at the time shown, is an average for three dogs.

In addition to the components listed below, each solution also contained 50 milligrams per milliliter of magnesium chloride hexahydrate, and 20 milligrams per milliliter of procaine hydrochloride.

| Ex. No. | Antibiotic, mg./ml. | Acid, mg./ml. | Blood levels at hours, micrograms per milliliter ||||| 
|---|---|---|---|---|---|---|---|
| | | | 1 | 2 | 4 | 6 | 8 |
| 15 | 50 tetracycline (neutral). | 225 gluconic. | 2.67 | 2.18 | 2.27 | 2.3 | 1.19 |
| 16 | 50 tetracycline hydrochloride | | 1.64 | 1.89 | 1.32 | 0.95 | 0.92 |
| 17 | ----do---- | 12.5 citric | 2.73 | 1.88 | 1.83 | 1.13 | 1.33 |
| 18 | ----do---- | 25 citric | 2.63 | 1.85 | 2.16 | 1.50 | 0.95 |
| 19 | ----do---- | 50 citric | 2.35 | 2.03 | 1.89 | 0.98 | 1.15 |
| 20 | 50 oxytetracycline hydrochloride. | ----do---- | 3.55 | 3.36 | 2.18 | 1.85 | 1.19 |
| 21 | ----do---- | 225 gluconic. | 3.45 | 2.65 | 2.37 | 1.65 | 1.13 |

EXAMPLE 22

500 parts of tetracycline hydrochloride and 1750 parts of anhydrous citric acid were ground together in a screen grinder. The mixture was sterilized by exposure to ethylene oxide containing sufficient carbon dioxide so as to be non-explosive at 40° C. for 7 hours. 500 parts of magnesium chloride hexahydrate were heated at 100° C. for 12 hours, then ground, and reheated for an additional 12 hours at 110° C. Part of the water of hydration was removed by this treatment. The sterile magnesium chloride, and the sterile mixture of tetracycline hydrochloride and citric acid were aseptically combined, and blended, then filled into vials, each vial containing 100 milligrams of tetracycline hydrochloride.

This formulation gives a product which will remain in solution with a tetracycline concentration of over 100 milligrams per milliliter. The solution has a pH of 1.2.

The solution is particularly suitable for veterinary work, as the concentration is high, and a smaller dosage may be used for large animals. The blood levels obtained are comparable to those previously set forth.

Various modifications of the exact formulas will be apparent to those skilled in the art. For instance, it is not common to use solutions containing procaine hydrochloride or other local anesthetics intravenously, so that the above compositions if prepared for intravenous injection, instead of intramuscular, would normally be prepared omitting the local anesthetic. Such variations and modifications are within the scope of the appended claims.

We claim:
1. An intramuscularly acceptable broad-spectrum antibiotic composition comprising an antibiotic selected from the group consisting of tetracycline and oxytetracycline, and their acid and basic salts, a soluble source of magnesium ions, and a soluble source of absorption enhancing ions selected from the group consisting of citrate ions, ascorbate ions, gluconate ions, thioglycollate ions and ions from soluble mineral acid salts of amino acids having a pH in aqueous solution of less than 3.5, said components being present in such form that when water is present an aqueous composition with a pH of less than 5 is formed.

2. The composition of claim 1 comprising additionally, water and in which the pH is less than 3.5 and the solution has between 5 and 100 milligrams of antibiotic per milliliter.

3. A storage stable intramuscularly acceptable tetracycline preparation containing tetracycline as an acid salt and the least sufficient of an acid selected from the group consisting of citric acid, ascorbic acid, gluconic acid, thioglycollic acid and soluble material acid salts of amino acids having a pH in aqueous solution of less than 3.5 that on solution, the final preparation will have a pH less than 5, and magnesium chloride.

4. A storage stable intramuscularly acceptable tetracycline preparation comprising tetracycline hydrochloride, citric acid, and magnesium chloride, said composition when dissolved in water having a pH between approximately 1.2 and 2.5.

5. An aqueous solution comprising the solution obtained by adding sufficient water to the composition of claim 4 that the antibiotic is present at a concentration of between 10 and 100 milligrams per milliliter.

6. A storage stable intramuscularly acceptable tetracycline preparation comprising tetracycline hydrochloride, ascorbic acid, and magnesium chloride, said composition when dissolved in water having a pH between approximately 1.9 and 2.5.

7. An aqueous solution comprising the solution obtained by adding sufficient water to the composition of claim 6 that the antibiotic is present at a concentration of between 10 and 100 milligrams per milliliter.

8. An aqueous intramuscularly injectable broad-spectrum antibiotic composition comprising, per milliliter, tetracycline ions equal to those obtained from 10 to 100 milligrams of tetracycline hydrochloride, citrate ions equal to those obtained from 10 to 250 milligrams of citric acid, and magnesium ions equal to those obtained from 10 to 100 milligrams of magnesium chloride hexahydrate, the pH being less than 5.

9. An aqueous intramuscularly injectable broad-spectrum antibiotic composition comprising, per milliliter, tetracycline ions equal to those obtained from 10 to 100 milligrams of tetracycline hydrochloride, ascorbate ions equal to those obtained from 10 to 250 milligrams of ascorbic acid, and magnesium ions equal to those obtained from 10 to 100 milligrams of magnesium chloride hexahydrate, the pH being less than 5.

10. An aqueous intramuscularly injectable broad-spectrum antibiotic composition comprising, per milliliter, oxytetracycline ions equal to those obtained from 10 to 100 milligrams of oxytetracycline hydrochloride, citrate ions equal to those obtained from 10 to 250 milligrams of citric acid, and magnesium ions equal to those obtained from 10 to 100 milligrams of magnesium chloride hexahydrate, the pH being less than 5.

11. An aqueous intramuscularly injectable broad-spectrum antibiotic composition comprising, per milliliter, oxytetracycline ions equal to those obtained from 10 to 100 milligrams of oxytetracycline hydrochloride, ascorbate ions equal to those obtained from 10 to 250 milligrams of ascorbic acid, and magnesium ions equal to those obtained from 10 to 100 milligrams of magnesium chloride hexahydrate, the pH being less than 5.

12. A dry storage stable composition for the preparation of an intramuscularly injectable broad-spectrum antibiotic comprising the composition of claim 1, the components being present in such quantities that on making up to 1000 parts with water, there is present antibiotic ions selected from the group consisting of tetracycline ions and oxytetracycline ions equal to the quantity obtained from 10 to 100 parts of said antibiotic as the hydrochloride salt, magnesium ions equal to that obtained from 10 to 100 parts of magnesium chloride hexahydrate, and absorption enhancing ions equal to the quantity obtained from 10 to 250 parts of an acid selected from the group consisting of citric acid, ascorbic acid, gluconic acid, thioglycollic acid, and soluble mineral acid salts of amino acids having a pH in aqueous solution of less than 3.5.

13. A storage stable dry composition for the preparation of an intramuscularly injectable broad-spectrum antibiotic comprising a dry mixture, which on the addition of water, gives the composition of claim 8.

14. A storage stable dry composition for the preparation of an intramuscularly injectable broad-spectrum antibiotic comprising a dry mixture, which on the addition of water, gives the composition of claim 9.

15. A storage stable dry composition for the preparation of an intramuscularly injectable broad-spectrum antibiotic comprising a dry mixture, which on the addition of water, gives the composition of claim 10.

16. A storage stable dry composition for the preparation of an intramuscularly injectable broad-spectrum antibiotic comprising a dry mixture, which on the addition of water, gives the composition of claim 11.

17. An aqueous intramuscularly injectable composition comprising oxytetracycline hydrochloride, magnesium chloride, and citric acid.

18. An aqueous intramuscularly injectable composition comprising an antibiotic selected from the group consisting of oxytetracycline hydrochloride and tetracycline hydrochloride, magnesium chloride and a water-soluble, non-toxic hydroxy acid selected from the group consisting of citric acid and ascorbic acid.

References Cited in the file of this patent

UNITED STATES PATENTS

| | | |
|---|---|---|
| 2,516,080 | Sobin | July 18, 1950 |
| 2,640,842 | Weidenheimer | June 2, 1953 |
| 2,644,782 | Harned | July 7, 1953 |
| 2,658,078 | Blase | Nov. 3, 1953 |
| 2,669,563 | Ruskin | Feb. 16, 1954 |
| 2,705,696 | Wolfe | Apr. 5, 1955 |

FOREIGN PATENTS

| | | |
|---|---|---|
| 503,866 | Canada | June 22, 1954 |

OTHER REFERENCES

Collins et al.: Ann. Int. Med., December 1948, p. 1078.

Eisner et al.: "Enhancement of Serum Levels of Aureomycin . . ." J. Pharmacology and Expt'l Therapeutics, August 1953, pp. 442–449.

Gray et al.: "The Enhancement of Chlortetracycline Absorption by Citric Acid," J. Pharmacology and Expt'l Therapeutics, Nov. 4, 1953, pp. 327–333.

Antibiotics Annual, 1953–1954 (December 1953), pp. 46–107.

Wright et al.: Antibiotics Annual, 1953–54 (December 1953), pages 137–140.

Reddish: "Antiseptics, Disinfectants, Fungicides, and Chemical and Physical Sterilization," Lea and Febiger, Philadelphia, 1954, pp. 647–651.